2 Sheets—Sheet 1.

C. G. & W. STOLL,

Assignors, by mesne assignments, to H. H. DOUBLEDAY.

Machine for Separating Grain, &c.

No. 8,628. Reissued Mar. 18, 1879.

Witnesses:

John S. Barker

F. L. Hamilton

Inventor.

Henry H Doubleday assignee of

Charles G Stoll and William Stoll

THE NORRIS PETERS CO., PHOTO-LITHO., WASHINGTON, D. C.

C. G. & W. STOLL,

Assignors, by mesne assignments, to H. H. DOUBLEDAY.

Machine for Separating Grain, &c.

No. 8,628. Reissued Mar. 18, 1879.

Witnesses:
John S Barker
T. L. Hamilton

Inventor
Henry H Doubleday
assignee of
Charles G Stoll
and William Stoll

THE NORRIS PETERS CO., PHOTO-LITHO., WASHINGTON, D. C.

UNITED STATES PATENT OFFICE.

HENRY H. DOUBLEDAY, OF WASHINGTON, DISTRICT OF COLUMBIA, ASSIGNEE, BY MESNE ASSIGNMENTS, OF CHARLES G. STOLL AND WILLIAM STOLL.

IMPROVEMENT IN MACHINES FOR SEPARATING GRAIN, &c.

Specification forming part of Letters Patent No. 54,263, dated April 24, 1866; Reissue No. 3,992, dated May 24, 1870; Reissue No. 8,628, dated March 18, 1879; application filed January 31, 1879.

*To all whom it may concern:*

Be it known that CHARLES G. STOLL and WILLIAM STOLL, both formerly of East New York, in the county of Kings and State of New York, have invented certain new and useful Improvements in Machines for Separating Grain and other Materials; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
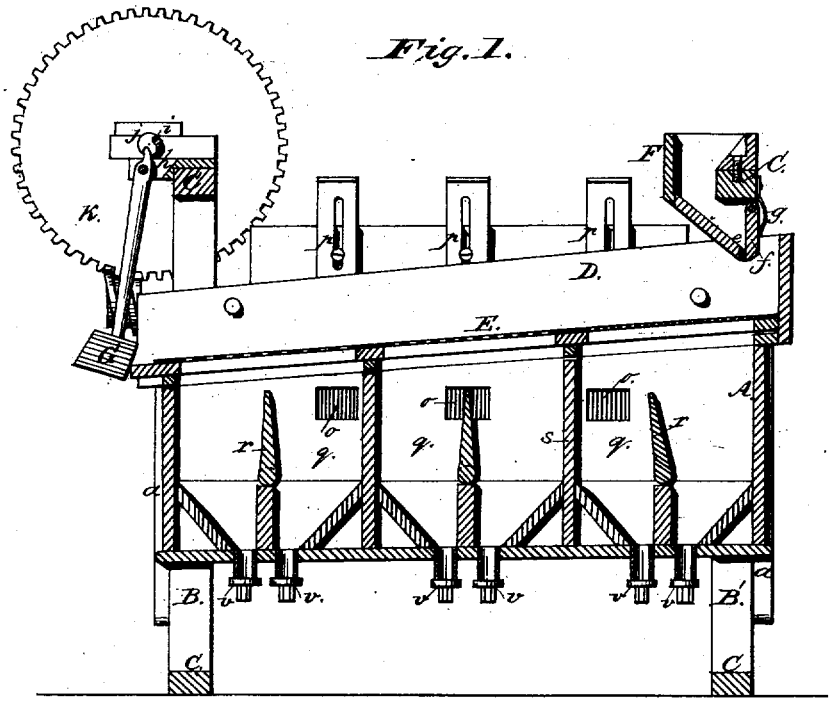
Figure 3:
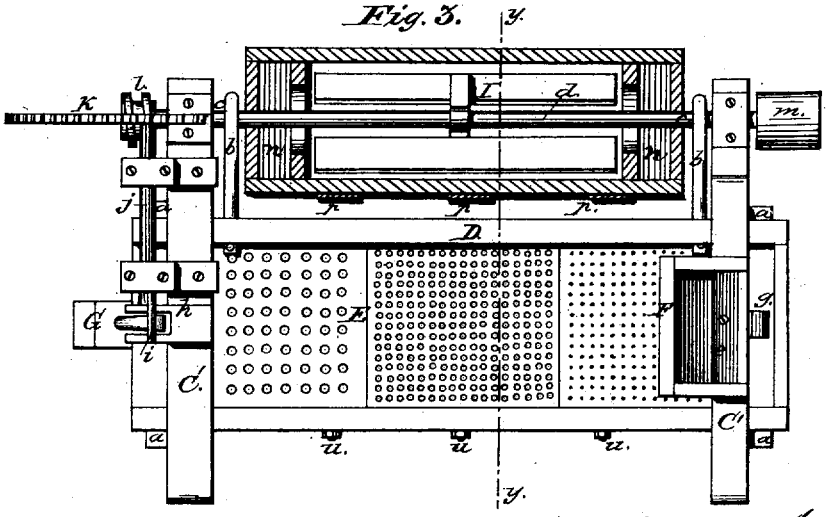
Figure 2:
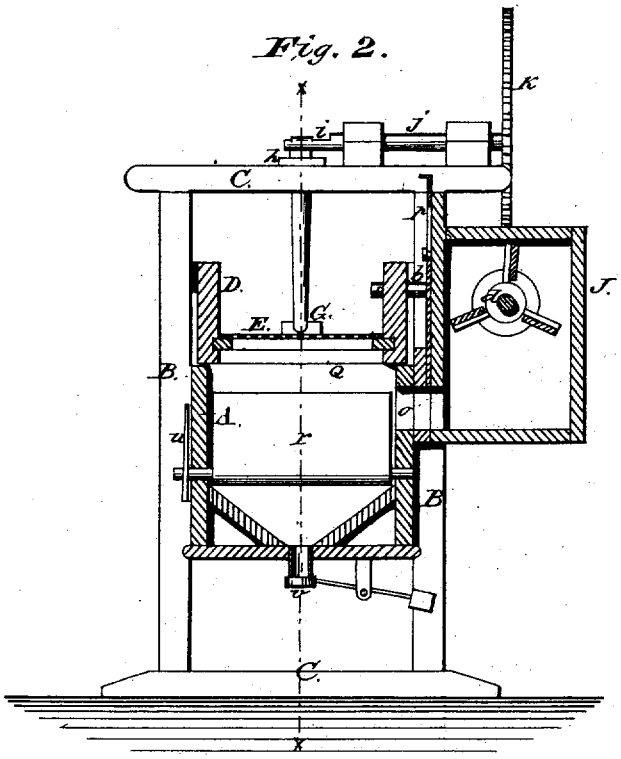

Figure 1 represents a longitudinal vertical section of this invention, the line *x x*, Fig. 2, indicating the plane of section. Fig. 2 is a transverse vertical section of the same, taken in the plane indicated by the line *y y*, Fig. 3. Fig. 3 is a plan or top view of the same, partly in section.

This invention relates to a machine intended for separating grain or any other material having different specific gravities and different grades or degrees of fineness by means of a sieve constructed with sections of different degrees of fineness, in combination with means for producing air-currents, which pass upward through the screen, as will be hereinafter fully explained.

The fan which serves to throw air under the separating-sieve is placed in a closed box, to which the air passes from below in such a manner that the air thrown into the separator is comparatively pure and free from the dust which contaminates the air above the separator. Said fan-box communicates with the space below the separating-sieve through a series of openings, which are opened or closed by suitable gates, and which lead into closed compartments under the sieve intended to receive the material passing through the meshes of the sieve, said compartments being provided with adjustable loaded or spring valves, which do not allow the contents thereof to discharge until the air has attained a certain pressure suitable to produce the desired effect on the material to be separated.

Each compartment is provided with an adjustable partition, the position of which is indicated by an index and scale on the outside of the box containing the sieve. By adjusting these partitions the material discharging into each compartment can be separated according to the difference in its specific gravity, the heavy parts passing through the sieve quicker than the light parts.

In the drawings, the letter A designates a box, made of wood or any other suitable material, and supported by uprights B B′, which are united at top and bottom by cross-bars C C′. The top edge of this box is cut off in an inclined direction, and it supports the shoe D, in which the sieve E is fastened. This sieve is made of three (more or less) sections of different fineness, the section on the upper end being the finest. The shoe D is supported by four springs, *a*, of wood or any other suitable material, which are securely fastened to the uprights B B′, and it connects by rods *b* with cranks *c* in a shaft, *d*, so that by turning said shaft a lateral shaking motion is imparted to the sieve.

The material to be separated is conducted to the sieve through a hopper, F, which has a long narrow discharge-opening, *e*, causing the material to flow in a broad shallow stream extending clear across said sieve, or nearly so. One side of this hopper forms a valve, *f*, which is held closed by a spring, *g*, thus allowing it to yield if a thick lump or some other impurities should come opposite the opening *e*, and by these means a choking up of said discharge-opening is prevented.

A hammer, G, is arranged opposite the lower end of the sieve, being suspended from a pivot in a bracket, *h*, secured to one of the cross-bars C. A cam, *i*, which is secured to the end of a shaft, *j*, and which, on being revolved on said shaft, comes in contact with a nose on the upper end of the helm of the hammer, causes said hammer to rise at certain intervals and to descend with considerable force, thereby producing an end shake of the sieve, which prevents the flour or other material from choking.

The shaft *j*, to which the cam *i* is attached, receives its motion by a large worm-wheel, K, which gears in a worm, *l*, on the blower-shaft *d*, said blower-shaft being caused to revolve by a belt stretched over a pulley, *m*, which is mounted on its end, and to which motion is imparted by a steam-engine, horse-power, or any other suitable motor.

The blower I, which is mounted on the shaft *d*, is inclosed in a box, J, to which access is had through a covered channel, *n*, from below in such a manner that all the air which passes to the blower is taken from below, the air above being saturated with dust rising from the machine, and by the action of the comparatively pure air thus injected into the box A the separation of impurities from grain or other materials is facilitated.

The blower I communicates with the box A by three (more or less) apertures, *o*, which are adjustable, or which can be opened or closed by means of gates *p*. Each of the apertures *o* communicates with one of the compartments or chambers *q*, into which the box A is divided up by partitions *s*. Each of these compartments corresponds in size and position to one of the sections of the sieve E, and each compartment is also provided with an adjustable valve or partition, *r*, secured to a rock-shaft, which has its bearings in the sides of the box A.

On the outer end of each rock-shaft is mounted an index, *u*, which travels over a suitable scale, by means of which the position of the partition or valve can be determined without opening the box A. The object of these movable partitions is to separate the grain or other material passing into one of the compartments, according to its fineness or specific gravity.

If the adjustable partition in one of said compartments is placed in a vertical position, the quantity of grain or other material collecting in this particular compartment is divided in two equal parts, that portion in the upper half of the compartment being somewhat finer than that in the lower compartment.

If it is desired to obtain a large quantity in the upper part of the compartment, the adjustable compartment is turned down toward the lowest end of the sieve; and if it is desired to obtain the largest quantity in the lower part of the compartment, the adjustable partition is inclined upward toward the highest part of the sieve. By this arrangement the operator is enabled to obtain six different grades of fineness if the box A is divided in three compartments, and the quantity collecting in each portion of the several compartments can be regulated at pleasure.

Each of the compartments or chambers *q* of the box A is provided with two valves, *v*, one on either side of the movable partition, and these valves are closed by weights or springs, which are so adjusted that they do not open until a certain quantity of material has accumulated on them. By this arrangement the air acting on the material to be separated preserves a certain pressure, and its full benefit is obtained.

By adjusting the weights or springs acting on the valves the pressure of air obtaining in the chamber can be regulated to suit the material to be separated, the sieves being placed on the box A, so that the air forced into said box is compelled to pass through the apertures in the sieve and to act with its full force on the material passing down over said sieve.

From the above description it will be seen that the fan is connected with the sieve by means of an air-tight conduit, whereby the air-current which is produced by said fan is compelled to pass through the sieve, so that by means of the air-openings in the conduit the force with which the air-current acts upon the material passing over the sieve may be regulated with great accuracy.

What is claimed as new is—

1. The combination, in a separator, of a reciprocating sieve constructed with sections of different degrees of fineness, a fan for causing air-currents to pass upward through the sieve and the material on the sieve, and adjustable openings for regulating the force of the air-currents in relation to the fineness or coarseness of the different sections of the sieve, substantially as set forth.

2. The combination, in a separator, of a reciprocating sieve constructed with sections of different degrees of fineness, a fan for causing air-currents to pass upward through the sieve and the material on the sieve, a continuous closed air-trunk connecting the fan with the sieve, and openings of different areas for regulating the force of the air-currents in relation to the fineness or coarseness of the different sections of the sieve, substantially as set forth.

3. The combination, in a separator, of a reciprocating sieve constructed with sections of different degrees of fineness, a fan causing atmospheric currents to pass through such sieves, and a series of air-conduits subdividing the air-currents and directing the action of the subdivisions in relation to the sections of the screen, substantially as set forth.

4. In a separator, the combination of a sieve having sections of different degrees of fineness with a fan for taking out the light impurities passing over the sieve, a series of air-conduits for subdividing the current of air, and gates for regulating the strength of the air-current thus applied to the several sections, substantially as set forth.

5. In a separator, the combination of a feed-hopper feeding the material in a thin stream across the entire width of the head of the sieve, a sieve constructed with progressively-coarser sections, by which the finer particles are gradually removed, and a fan and casing for causing a continuous current of air to act through the sieve and on the material with a force which constantly increases as the material submitted to this action becomes relatively coarser, substantially as set forth.

6. In a separator, a feed-hopper provided at the bottom with a feeding-throat permitting a continuous feed, and having the lower portion of one side constructed to yield laterally and automatically to permit the passage of the material, substantially as set forth.

7. The adjustable valves or partitions *r* in the compartments *q* of the box A, in combination with the sieve E, substantially as and for the purpose set forth.

In testimony that I claim the foregoing I have hereunto set my hand this 31st day of January, 1879.

HENRY H. DOUBLEDAY.

Witnesses:
M. P. CALLAN,
H. H. BLISS.